United States Patent
Kang et al.

(10) Patent No.: US 10,241,751 B2
(45) Date of Patent: Mar. 26, 2019

(54) TERMINAL AND SPEECH-RECOGNIZED TEXT EDIT METHOD THEREOF

(71) Applicant: Samsung Electronics Co., Ltd, Yeongtong-gu, Suwon-si (KR)

(72) Inventors: Sangki Kang, Gyeonggi-do (KR); Kyungtae Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/950,053

(22) Filed: Jul. 24, 2013

(65) Prior Publication Data
US 2015/0032460 A1    Jan. 29, 2015

(30) Foreign Application Priority Data

Jul. 24, 2012 (KR) .................. 10-2012-0080635

(51) Int. Cl.
*G06F 3/16* (2006.01)
*G06F 3/0488* (2013.01)
*G06F 17/24* (2006.01)
*G10L 15/22* (2006.01)

(52) U.S. Cl.
CPC .......... *G06F 3/167* (2013.01); *G06F 3/04883* (2013.01); *G06F 17/24* (2013.01); *G06F 2203/0381* (2013.01); *G10L 2015/221* (2013.01)

(58) Field of Classification Search
None
See application file for complete search history.

(56) References Cited

U.S. PATENT DOCUMENTS

| | | | | |
|---|---|---|---|---|
| 5,855,000 A * | 12/1998 | Waibel et al. | ................. | 704/235 |
| 5,862,256 A * | 1/1999 | Zetts | .................... | G06F 3/04883 382/187 |
| 6,021,218 A * | 2/2000 | Capps et al. | ................... | 382/187 |
| 6,340,967 B1 * | 1/2002 | Maxted | ............... | G06F 3/04883 345/156 |
| 6,581,033 B1 * | 6/2003 | Reynar | ..................... | G06F 3/16 704/231 |
| 7,260,529 B1 * | 8/2007 | Lengen | ..................... | G06F 3/16 704/235 |
| 2003/0006974 A1 * | 1/2003 | Clough | ................. | G06F 1/1626 345/179 |
| 2003/0028382 A1 * | 2/2003 | Chambers | ............... | G10L 15/26 704/275 |
| 2003/0055655 A1 * | 3/2003 | Suominen | ............... | G06F 3/167 704/276 |
| 2004/0021700 A1 * | 2/2004 | Iwema et al. | ................. | 345/863 |
| 2005/0099406 A1 * | 5/2005 | Pettiross et al. | ............. | 345/179 |
| 2005/0159950 A1 * | 7/2005 | Roth | ....................... | G10L 15/22 704/236 |

(Continued)

*Primary Examiner* — Michael N Opsasnick

(57) ABSTRACT

A terminal and speech-recognized text edit method edit the text input through writing recognition or speech recognition function efficiently. The text edit method includes displaying at least one letter input through speech recognition; detecting one of touch and speech inputs; analyzing the detected input; and performing a certain operation corresponding to the at least one letter based on the analysis result. The terminal and speech-recognized text edit method are advantageous in editing misrecognized speech-input text efficiently though finger or pen gesture-based or speech recognition-based input.

8 Claims, 16 Drawing Sheets

(56) References Cited

U.S. PATENT DOCUMENTS

| | | | |
|---|---|---|---|
| 2005/0171783 A1* | 8/2005 | Suominen | G06F 3/167 704/276 |
| 2006/0209014 A1* | 9/2006 | Duncan | G06F 3/04883 345/156 |
| 2008/0299960 A1* | 12/2008 | Lockhart | G06Q 10/109 455/418 |
| 2009/0000831 A1* | 1/2009 | Miller | G06F 3/03545 178/19.01 |
| 2009/0306980 A1* | 12/2009 | Shin | 704/235 |
| 2009/0326938 A1* | 12/2009 | Marila | G10L 15/22 704/235 |
| 2010/0031143 A1* | 2/2010 | Rao | G06F 3/0237 715/261 |
| 2010/0223055 A1* | 9/2010 | McLean | 704/235 |
| 2010/0248757 A1* | 9/2010 | Baek | 455/466 |
| 2011/0041102 A1* | 2/2011 | Kim | 715/863 |
| 2011/0154268 A1* | 6/2011 | Trent, Jr. | G06F 3/04883 715/863 |
| 2011/0166851 A1* | 7/2011 | LeBeau | G06F 17/273 704/9 |
| 2011/0302530 A1* | 12/2011 | Harris et al. | 715/810 |
| 2012/0127082 A1* | 5/2012 | Kushler | G06F 3/04886 345/169 |
| 2012/0146955 A1* | 6/2012 | Martin-Cocher | G06F 3/0236 345/176 |
| 2012/0260177 A1* | 10/2012 | Sehrer | 715/727 |
| 2012/0287053 A1* | 11/2012 | Bos et al. | 345/173 |
| 2013/0021270 A1* | 1/2013 | Lee | 345/173 |
| 2013/0167062 A1* | 6/2013 | Herring et al. | 715/773 |
| 2013/0297307 A1* | 11/2013 | Paek et al. | 704/235 |

* cited by examiner

TERMINAL AND SPEECH-RECOGNIZED TEXT EDIT METHOD THEREOF

CROSS-REFERENCE TO RELATED APPLICATION(S) AND CLAIM OF PRIORITY

The present application is related to and claims the benefit under 35 U.S.C. § 119(a) of a Korean patent application filed on Jul. 24, 2012 in the Korean Intellectual Property Office and assigned Serial No. 10-2012-0080635, the entire disclosure of which is hereby incorporated by reference.

TECHNICAL FIELD

The present disclosure relates to a terminal and speech recognized text edit method thereof and, in particular, to a terminal and method for editing the text input through writing recognition or speech recognition function efficiently.

BACKGROUND

Recently, researches are being conducted on speech recognition-based manipulation of speech recognition-enabled terminal.

However, there are many problems to be solved in the current speech recognition technology, e.g. low accuracy caused by lack of ambient noise and unclear pronunciation processing capabilities.

In order to overcome the above problems, the recognized speech is presented to the user in the form of text such that the user edits the text. However, the conventional speech-recognized text edit method limited in editing efficiency between speech recognition and user input due to the disposability of editing and lack of intuitive text edit capability.

SUMMARY

To address the above-discussed deficiencies of the prior art, it is a primary object of the present disclosure to provide a terminal and speech-recognized text edit method thereof that is capable of facilitating edit of the speech-recognized text with at least one of touch input, pen input, and speech input.

In accordance with an aspect of the present disclosure, a method for editing text includes displaying at least one letter input through speech recognition; detecting one of touch and speech inputs; analyzing the detected input; and performing a certain operation corresponding to the at least one letter based on the analysis result.

In various embodiments, analyzing includes checking, when a touch input is detected, type of the touch based on presence of at least one of touch position, drag occurrence, shape, text inclusion, duration, auxiliary key activation, and consecutive touches; and performing, when a speech input is detected, speech recognition on the speech input.

In various embodiments, the certain operation set distinctively depending on whether the auxiliary key is activated.

In various embodiments, performing includes detecting one of new touch and speech inputs in response to the certain operation; analyzing the detected input; and performing a new certain operation corresponding to the at least one letter based on the analysis result.

In various embodiments, the certain operation is one of input, delete, crop, transpose, conversion, and save.

In various embodiments, performing includes determining, when the touch input is of a special symbol, determining a sentence type among a declarative sentence, and interrogative sentence, and an exclamatory sentence, based on the special symbol.

In various embodiments, performing includes controlling a function in response to the detected input.

In various embodiments, the function is one of Natural Language Processing (NLP), placing call, sending text message, saving memo, information search, and multimedia playback.

In various embodiments, performing includes displaying a submenu including at least one of text edit, substitute letter list, and font change items.

In accordance with another aspect of the present disclosure, a terminal includes a display unit which display at least one letter input through speech recognition; a touch input unit which detects a touch input; a speech input unit which detects a speech input; and a control unit which detects one of touch and speech inputs, analyzes the detected input, and performs a certain operation corresponding to the at least one letter based on the analysis result.

In various embodiments, the control unit checks, when a touch input is detected, type of the touch based on presence of at least one of touch position, drag occurrence, shape, text inclusion, duration, auxiliary key activation, and consecutive touches, and performs, when a speech input is detected, speech recognition on the speech input.

In various embodiments, the certain operation set distinctively depending on whether the auxiliary key is activated.

In various embodiments, the control unit controls the touch input unit and the speech input unit to detect one of new touch and speech inputs in response to the certain operation, analyzes the detected input, and performs a new certain operation corresponding to the at least one letter based on the analysis result.

In various embodiments, the control unit controls one of functions of Natural Language Processing (NLP), placing call, sending text message, saving memo, information search, and multimedia playback.

In various embodiments, the control unit controls the display unit to display a submenu including at least one of text edit, substitute letter list, and font change items, in response to the detected input.

In accordance with another aspect of the present disclosure, a method of editing text includes displaying at least one letter input through speech recognition; determining, when a touch input is detected, whether the touch input is made in a state that an auxiliary key is activated; and performing a certain operation based on the determination result, the certain operation being set distinctively depending on whether the auxiliary key is activated.

In accordance with still another aspect of the present disclosure, a method of editing text includes displaying at least one letter input through speech recognition; analyzing, when a touch input is detected, the touch input; detecting a speech input in correspondence to the analysis result; and performing a certain operation corresponding to the at least one letter based on the detected speech input.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. In the following description, the mobile terminal can by any of all types devices equipped with a radio communication unit for voice telephony, the devices including smartphone, tablet PC, laptop PC, desktop PC, video phone, etc.

The present disclosure can be applied in editing text on the terminal capable of displaying text input through text recognition function and speech-to-text conversion function.

The present disclosure is applicable to any of all types of speech recognition-enabled devices including smartphone, portable terminal, mobile terminal, Personal Digital Assistant (PDA), Portable Multimedia Player (PMP), laptop computer, note pad, WiBro terminal, smart TV, smart refrigerator, etc.

The terminology used herein is for the purpose of describing particular embodiments only and is not intended to be limiting of the disclosure. Unless otherwise defined, all terms used herein have the same meaning as commonly understood by one of ordinary skill in the art to which this disclosure pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Exemplary embodiments of the present disclosure are described with reference to the accompanying drawings in detail.

Figure 1:
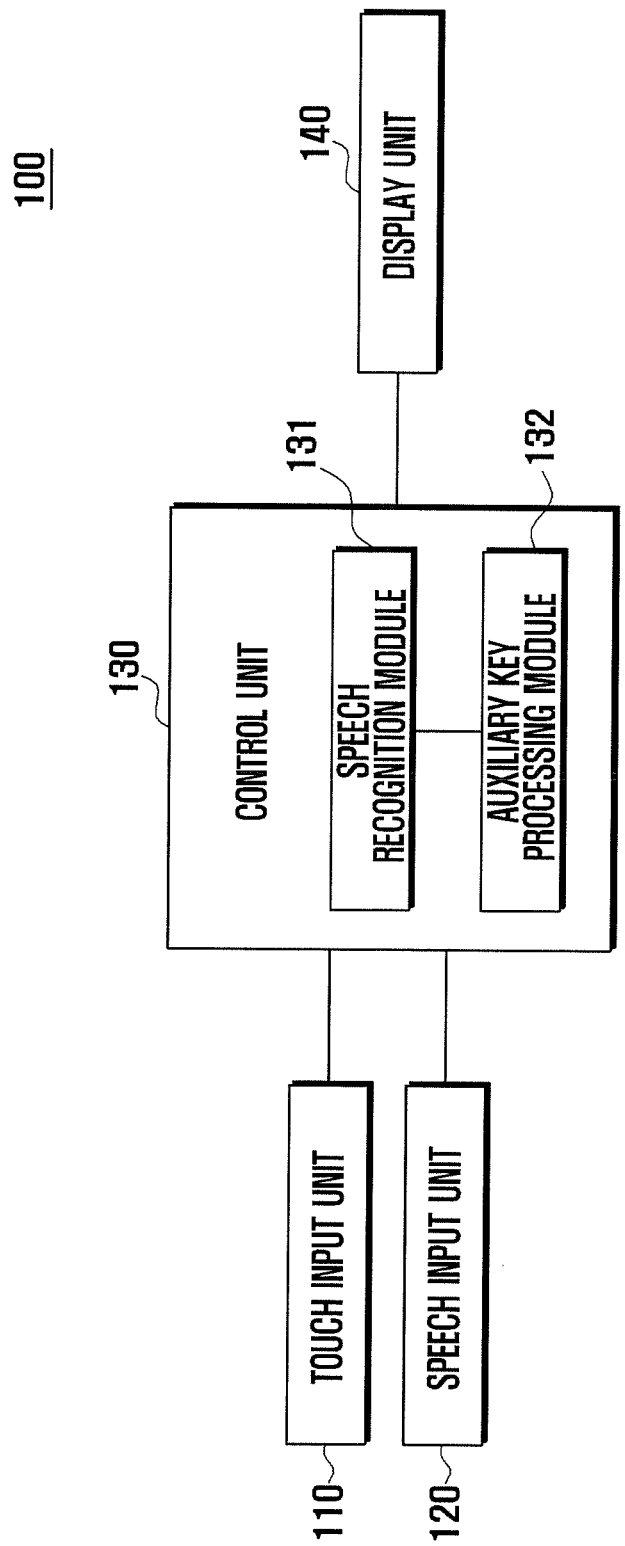
FIG. 1 illustrates a block diagram of the configuration of the terminal according to various embodiments of the present disclosure.

FIG. 1 illustrates a block diagram of the configuration of the terminal according to various embodiments of the present disclosure.

As shown in FIG. 1, the terminal 100 includes a touch input unit 110, a speech input unit 120, a control unit 130, and a display unit 140.

The touch input unit 110 generates a manipulation signal corresponding to a touch gesture made by the user for controlling the operation of the terminal 100. The touch input unit 110 may include at least one of a touch sensor and a proximity sensor for detecting the user's touch gesture.

The touch sensor may be implemented in the form of a touch film, a touch sheet, or a touch pad.

The touch input unit 110 detects a touch gesture by means of the sensor and generates a corresponding touch signal to the control unit 130. The control unit 130 analyzes the touch signal to determine the type of the touch with various properties (e.g. touch position, touch shape, letter/symbol, touch direction, touch duration, and touch movement state). The information on the touch type is displayed on the screen of the display unit 140.

The touch input unit 110 is capable of receiving the touch gesture made by means of various input tools. For example, the touch input unit 110 is capable of detecting the touch gesture made by the user's finger and/or a physical tool such as stylus pen.

The speech input unit 120 receives the audio signal input through the microphone and processes the audio signal to generate electric audio data in one of telephony mode, recording mode, and speech recognition mode. The speech input unit 120 may be provided with various noise cancellation algorithms for removing the noise occurring in receiving the speech.

The control unit 130 controls overall operations of the components of the terminal 100. For example, the control unit 130 is capable of displaying the text generated through speech recognition on the speech input through the speech input unit 120 and controlling edit of the text.

In order to accomplish this, the control unit 130 includes a speech recognition module (Automatic Speed Recognition Module) 131 and an auxiliary key processing module 132.

The speech recognition module 131 processes the speech input through the speech input unit 120. In detail, the speech recognition module 131 extracts the properties of the speech and compares the properties with the speech data. The speech recognition module 131 is capable of analyzing the properties of the speech frequency through Fast Fourier Transform (FFT) or analyzing the properties of the speech waveform to form the speech data.

The speech recognition module 131 is capable of converting the speech data to at least one of pattern-matched numbers and letters to generate a text.

The speech recognition module 131 is capable of being implemented in an external server connected through a data communication link established by means of a communication module other instead of being implemented in the terminal 100.

According to an embodiment of the present disclosure, the control unit 130 is capable of controlling the display unit 140 to display at least one letter formed by means of the speech recognition module 131 and editing the at least one letter according to the user input.

The auxiliary key processing module 132 is capable of determining whether the data input by means of the touch input unit 110 is of an auxiliary key input. In detail, if the user makes a manipulation gesture to the touch input unit 110 with an input tool, e.g. stylus pen, having an auxiliary key, the auxiliary key processing module 132 analyzes the manipulation gesture to determine whether the gesture is made in the state that the auxiliary key is enabled.

According to an embodiment of the present disclosure, the control unit 130 is capable of controlling the terminal 100 to perform distinct operations in response to the inputs with and without activation of the auxiliary key depending on the processing result of the auxiliary key processing module 132.

A description is made of the operations of the control unit 130 in detail hereinafter with reference to accompanying drawing.

The display unit 140 displays (outputs) the information processed in the terminal 100. For example, the display unit 140 is capable of displaying speech recognition-related User Interface (UI) or Graphic UI (GUI) and at least one letter generated through speech recognition.

According to an embodiment of the present disclosure, the display unit 140 is capable of displaying at least one letter constituting the text data generated by the speech recognition module 131.

The display unit 140 can be implemented with any of Liquid Crystal Display (LCD), Thin Film Transistor LCD (TFT LCD), Organic Light Emitting Diode (OLED), flexible display, and 3D display.

The terminal 100 may include two or more display units depending on the terminal implementation.

The display unit 140 may be implemented as a touch-screen in the layered structure with a touch sensor.

Hereinafter a description is made of the speech processing procedure of the terminal according to an embodiment of the present disclosure.

Figure 2:
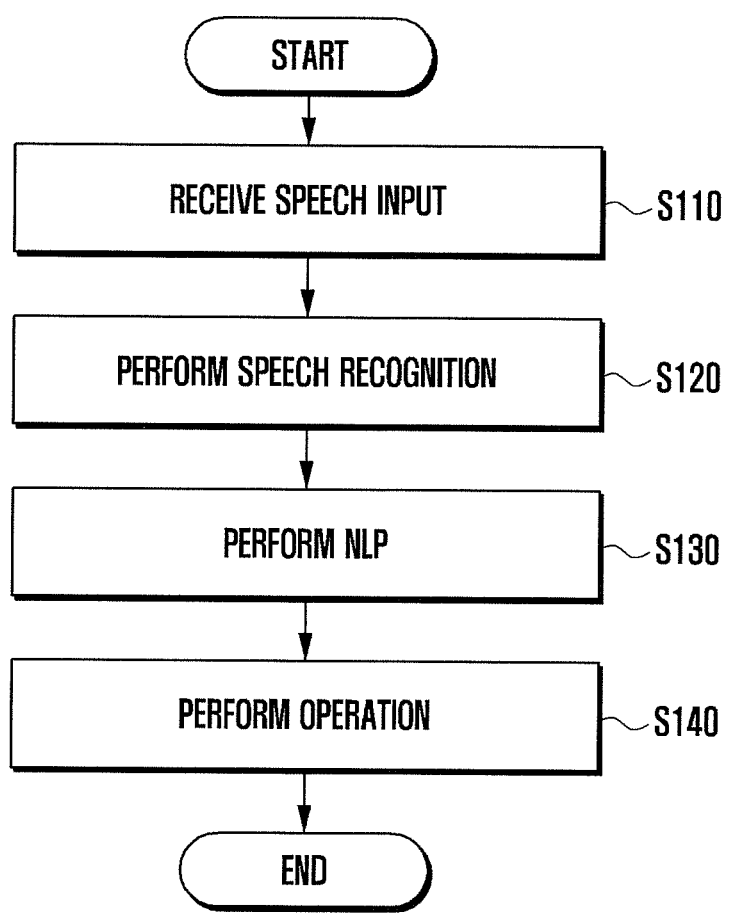
FIG. 2 illustrates a flowchart of a speech processing procedure of the speech-recognized text edit method of the terminal according to various embodiments of the present disclosure.

FIG. 2 illustrates a flowchart of a speech processing procedure of the speech-recognized text edit method of the terminal according to various embodiments of the present disclosure.

Referring to FIG. 2, the speech processing procedure is performed as follows.

The control unit 130 first receives a speech input at step S110.

The control unit 130 is capable of receiving the user's speech input through the speech input unit 120. The control unit 130 is capable of performing noise cancellation or amplification on the speech input.

Next, the control unit 130 performs speech recognition (Automatic Speech Recognition (ASR)) on the speech input at step S120.

The control unit 130 is capable of generating at least one letter corresponding to the speech through speech recognition on the speech input. The control unit 130 is capable of generating at least one letter including alphabet, number, symbol, and space.

Next, the control unit 130 performs Natural Language Processing (NLP) at step S130.

The control unit 130 performs NLP on the text generated through speech recognition to extract at least one component of speech, e.g. noun, adjective, and verb. The control unit 130 is also capable of analyzing the meaning of the speech which is input through NLP.

Finally, the control unit 130 controls to perform an operation corresponding to the NLP result at step S140.

The control unit 130 is capable of executing a certain function such as information search, answering a question, and automatic translation/interpretation according to the speech meaning analysis result based on the NLP result.

A description is made of the procedure of editing text generated through speech recognition in the speech-recognized text edit method in detail hereinafter.

Figure 3:
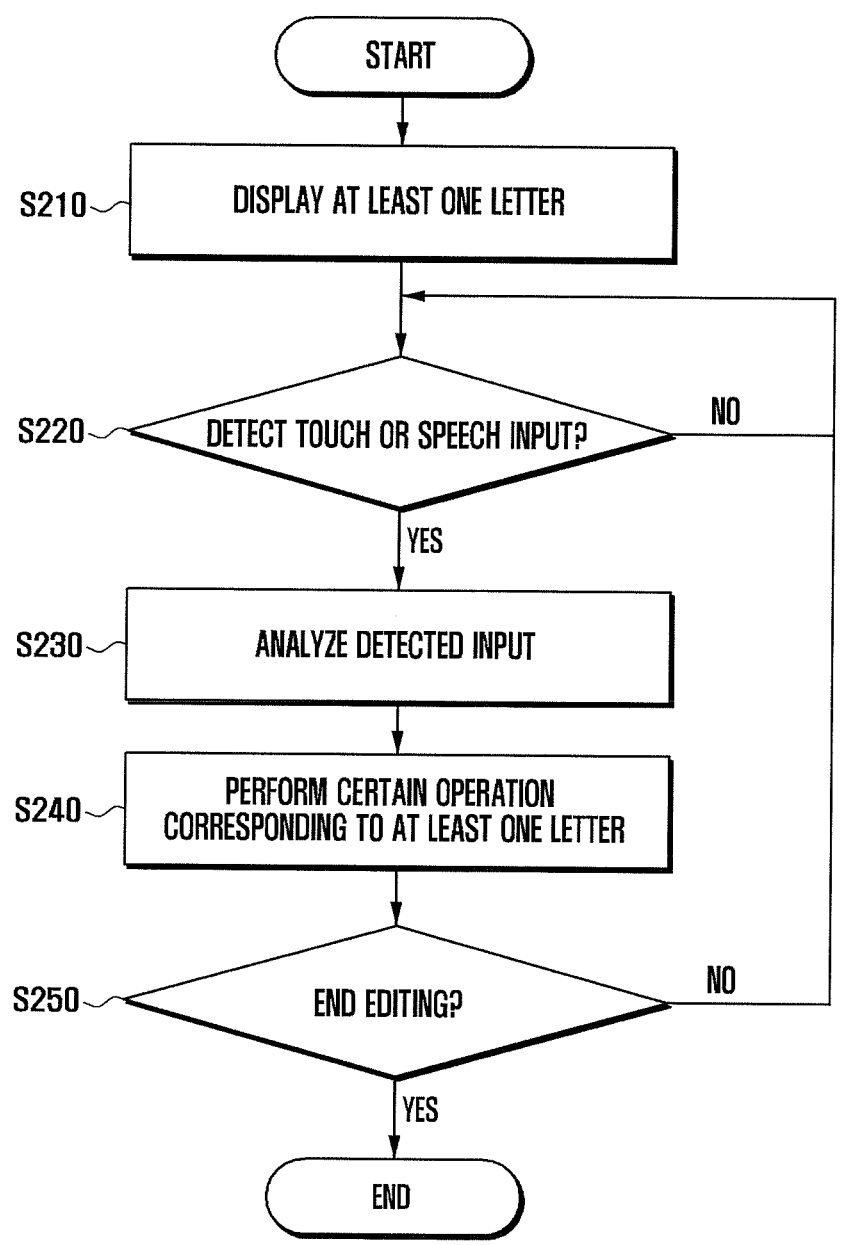
FIG. 3 illustrates a flowchart of the procedure of editing the text generated through speech recognition in the speech-recognized text edit method according to various embodiments of the present disclosure.

FIG. 3 illustrates a flowchart of the procedure of editing the text generated through speech recognition in the speech-recognized text edit method according to various embodiments of the present disclosure.

Referring to FIG. 3, the speech-recognized text edit procedure is performed as follows.

The control unit 130 first controls to display at least one letter at step S210.

The control unit 130 is capable of displaying at least one letter generated through speech recognition. The control unit 130 is capable of controlling the display unit 130 to display at least one letter including alphabet, number, symbol, and space.

The control unit 130 is capable of displaying UIs associated with the speech recognition function and other functions of editing and storing the at least one letter generated through speech recognition.

Next, the control unit 130 detects a touch or speech input at step S220.

The control unit 130 is capable of detecting the touch input on the touchscreen of the display unit 130 or the speech input by means of the speech input unit 120.

If a speech input is detected, the control unit 130 may execute various noise cancellation algorithms to remove noise occurring in the speech input process.

If the touch or speech input is detected, the control unit 130 analyzes the touch or speech input at step S230.

In detail, if a touch input is detected, the control unit 130 analyzes the touch type. The touch type may be determined with at least one property including touch position, drag occurrence, touch shape, touch-input letter, touch duration, user of auxiliary key, consecutive touch, etc.

There is at least one touch position depending on whether the touch is a single touch or multi-touch. The touch may be made onto at least one letter, between letters, or empty space.

The drag occurrence denotes whether a drag gesture is made in a direction in the state that the single touch or the multi-touch is maintained. If a drag gesture is detected, the control unit 130 analyzes the type of drag with the properties including drag position (e.g. between letters, below letters, and empty space), length, and direction.

The touch type may be any of closed figures (including circle, quadrangle, triangle, diamond, etc.) and proof-correction marks (including V, Λ, ~, ∩, _, -, etc.).

The touch-input letter denotes whether the letter includes at least one of Korean character, English character, and special symbol. The letter may be a certain character selected by the user of a command for executing a function of the terminal 100.

The touch duration denotes the time duration in which the touch is maintained, and the control unit 130 may include a counter for measuring the touch duration with a threshold value for controlling the terminal according to the actual touch duration.

The use of auxiliary key denotes whether the input tool is used in the state that the auxiliary key is activated. The input tool having the auxiliary key may be a stylus pen.

The consecutive touch denotes whether the touch occurs several times in certain time duration. The control unit 130 may set relatively short time duration for judging the consecutive touch.

If a speech input is detected, the control unit 130 may perform speech recognition on the speech input. The control unit 130 may generate at least one letter as a consequence of the speech recognition.

Next, the control unit 130 performs a certain operation on the at least one letter at step S240.

The control unit 130 is capable of performing a certain operation on the at least one letter based on the analysis result of the touch input or the speech input.

The certain operation on the at least one letter may be configured distinctively for the case whether the touch input is made in the state that the auxiliary key is activated. For example, in the case that the touch input corresponds to the word "transmit", the control unit 130 controls generates the word "transmit" for the input without activation of the auxiliary key and transmits the text to another terminal for the input with activation of the auxiliary key.

In response to a certain operation, the control unit 130 may perform the operation of detecting a new touch input or speech input. In this case, the control unit 130 analyzes the new touch input or speech input and performs a new operation with the at least one letter based on the analysis result.

The control unit 130 is also capable of performing an edit operation such as text input, delete, crop, copy, paste, position switching, text conversion, and save.

In the case that the certain operation is touch input of special symbol, the control unit 130 may determine the type of the sentence such as declarative sentence, interrogative sentence, and exclamatory sentence based on the special symbol.

The control unit 130 is also capable of controlling a terminal function corresponding to the touch input or speech input as the certain operation. The terminal function may be any of NLP, placing a call, transmitting text message, saving memo, searching information, and multimedia playback.

The control unit 130 is also capable of display a sub-menu including at least one text edit, replacement text list, and font change as the certain operation.

The control unit 130 is capable of performing at least one of certain operations simultaneously or sequentially. For example, the control unit 130 is capable of selecting at least one of letters and copying the selected letter.

A description is made of the operation of the control unit 130 to at least one letter according to an embodiment of the present disclosure in detail hereinafter with reference to accompanying drawings. Although the operations of the control unit 130 are described with a few exemplary embodiments herein, the present disclosure is not limited thereto, but various modifications and changes may be made without departing from the scope of the present disclosure.

Figure 4:
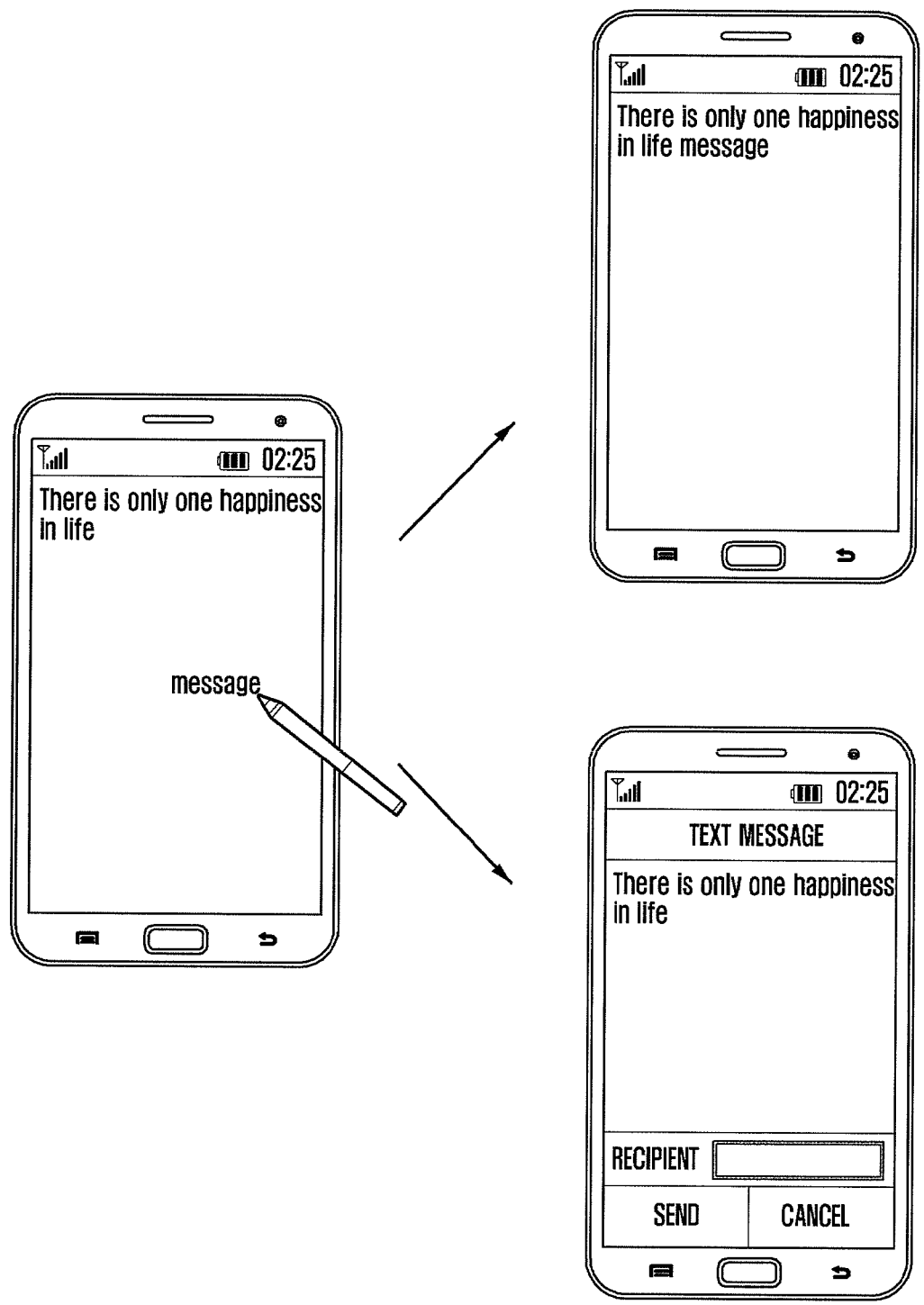
FIG. 4 illustrates a diagram of an exemplary situation of editing text in the terminal according to various embodiments of the present disclosure.
Figure 5:
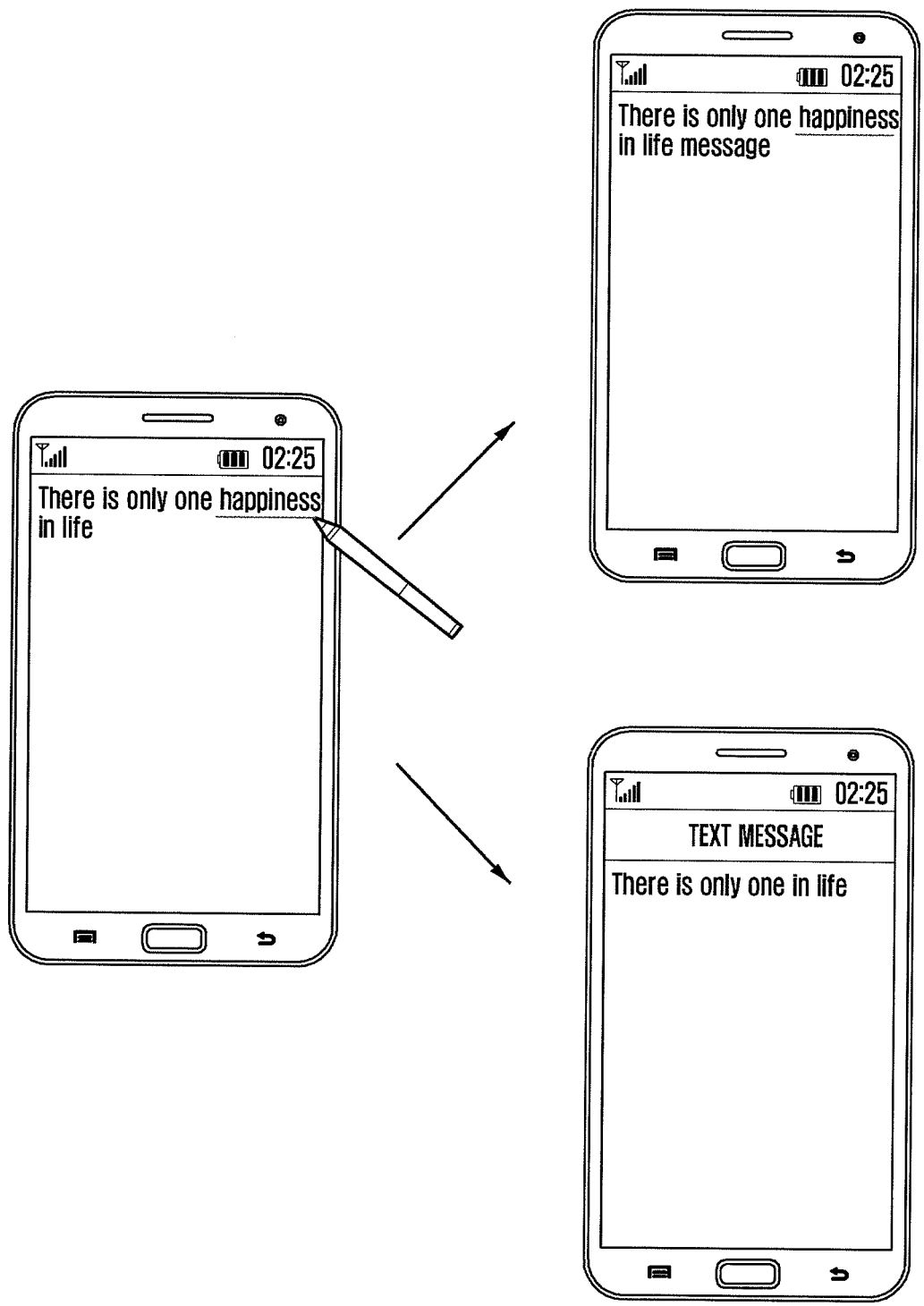
FIG. 5 illustrates a diagram of an exemplary situation of editing text in the terminal according to various embodiments of the present disclosure.

FIGS. 4 and 5 illustrate exemplary situations of editing text in the terminal according to various embodiments of the present disclosure.

The control unit 130 is capable of performing distinct operations depending on whether the touch input is made with or without activation auxiliary key.

In the exemplary case of FIG. 4, if the user makes a touch or speech input of text "message" without activation of the auxiliary key, the control unit 130 enters the text at a certain position. In contrast, if the user makes a touch or speech input of text "message" with activation of the auxiliary key, the control unit 130 controls the terminal 100 to perform a function corresponding to the user input "message", e.g. perform a text messaging function.

In the exemplary case of FIG. 5, if a touch input is made under at least one letter in the form of a line without activation of the auxiliary key, the control unit 130 may control to draw an underline below the at least one letter. If the touch input is made with activation of the auxiliary key, the control unit 130 may control to perform selecting, deleting, cropping, copying, pasting, saving, presenting submenu on the at least one letter in accordance to the position and length of the line.

The exemplary embodiments of FIGS. 4 and 5 can be implemented with various modifications.

For example, if a touch input is made without activation of the auxiliary key, the control unit 130 may wait for detecting new touch or speech input for generating at least one letter. Otherwise, if the touch input is made with activation of the auxiliary key, the control unit 130 may wait for detecting new touch or speech input for executing NLP, placing a call, sending a text message, saving a memo, searching for information, and playing a multimedia file in association with the at least one letter.

Of course, the above described operations can be performed inversely in the distinct cases with and without activation of the auxiliary key.

Figure 6:
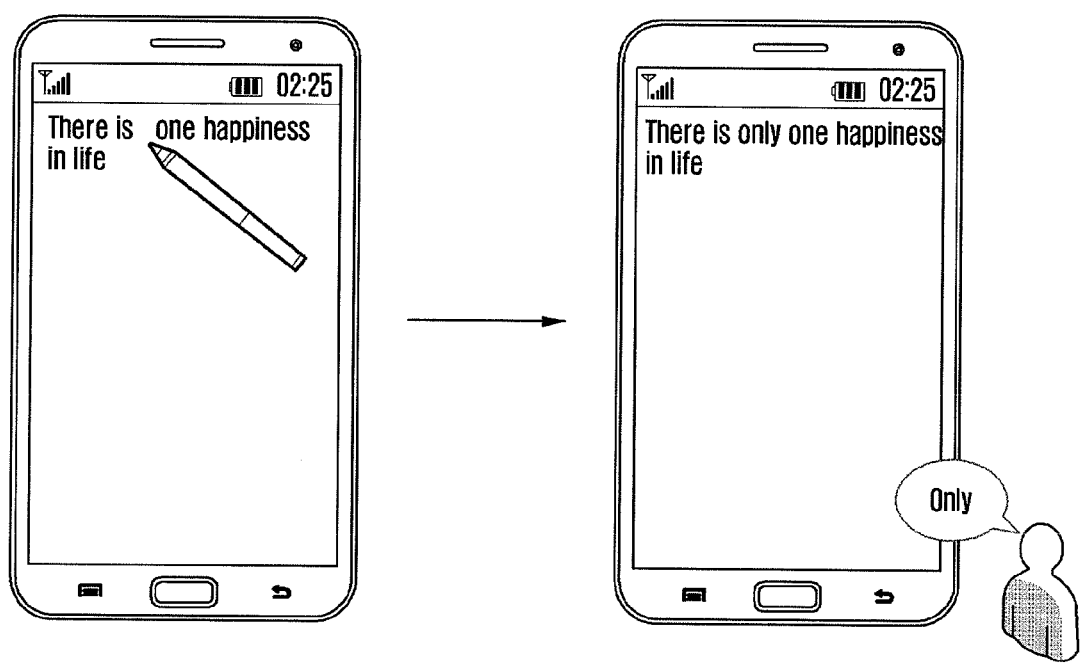
FIG. 6 illustrates a diagram of an exemplary situation of editing text in the terminal according to various embodiments of the present disclosure.
Figure 7:
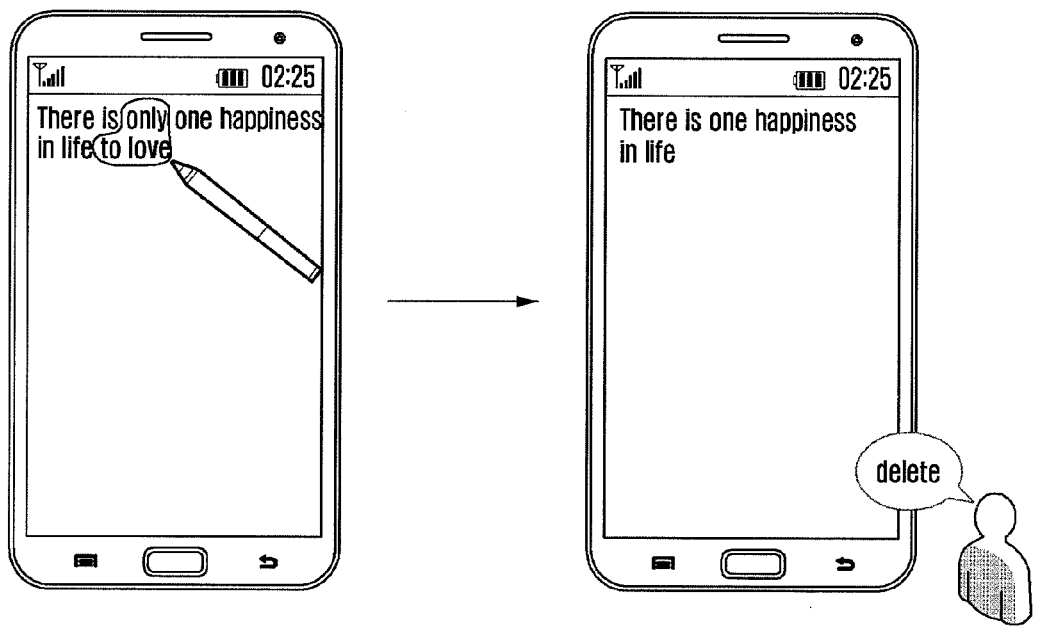
FIG. 7 illustrates a diagram of an exemplary situation of editing text in the terminal according to various embodiments of the present disclosure.

FIGS. 6 and 7 illustrate exemplary situations of editing text in the terminal according to various embodiments of the present disclosure.

The control unit 130 is capable of detecting a new touch or speech input in response to a certain gesture.

Referring to FIGS. 6 and 7, if a certain gesture is of selecting at least one letter or moving the cursor to a certain position, the control unit 130 detects a new touch or speech input corresponding to the certain gesture. Selecting at least one letter or moving the cursor can be executed in such a way of making a touch input having at least one touch positions, drawing a closed figure, drawing a certain shape for designating an area, dragging gesture to at least one letter, or making a speech input corresponding to at least one letter.

The control unit 130 is also capable of detecting a new touch or speech input when the touch input is maintained over a predetermined duration or made with activation of the auxiliary key.

At this time, the control unit 130 may control the display unit 130 to display the UI for notifying of the detection of new touch or speech input.

If a new touch or speech input is detected, the control unit 130 analyzes the new touch or speech input and performs a new operation to the at least one letter based on the analysis result.

In the exemplary embodiment of FIG. 6, the control unit 130 is capable of inserting at least one letter generated by the new touch or speech input into a certain position of the previously input text or replacing at least one previously written letter with at least one new letter.

In the exemplary embodiment of FIG. 7, the control unit 130 may control the terminal to perform a function of performing NLP, placing a call, sending a text message, saving a memo, searching for information, and playing a multimedia file in response to the ne2 touch or speech input.

Figure 8:
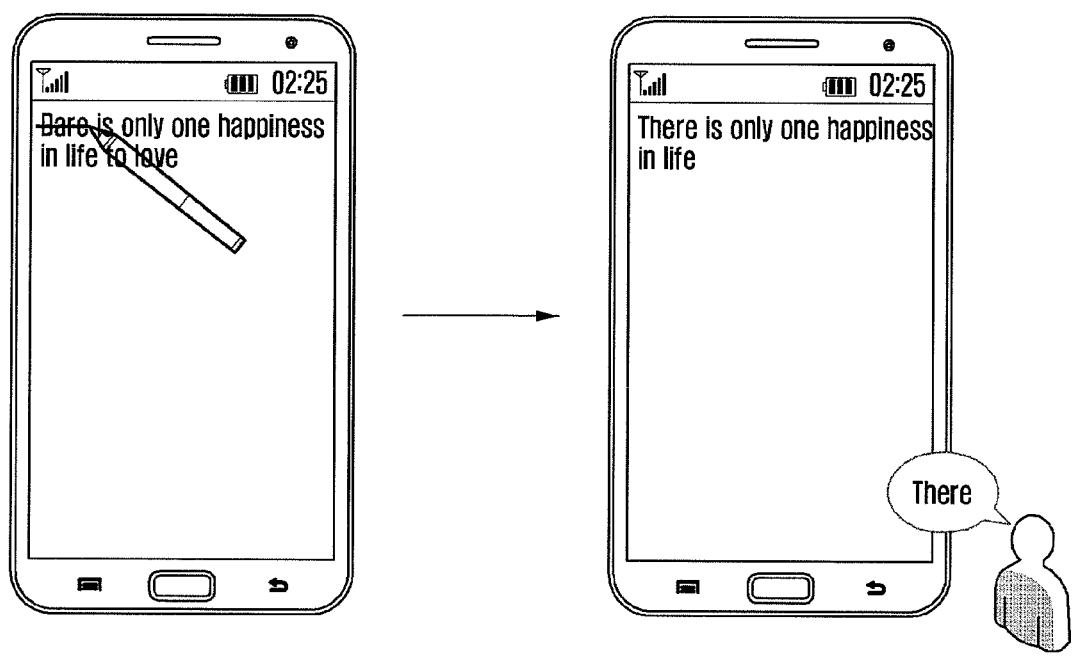
FIG. 8 illustrates a diagram of an exemplary situation of editing text in the terminal according to various embodiments of the present disclosure.
Figure 9:
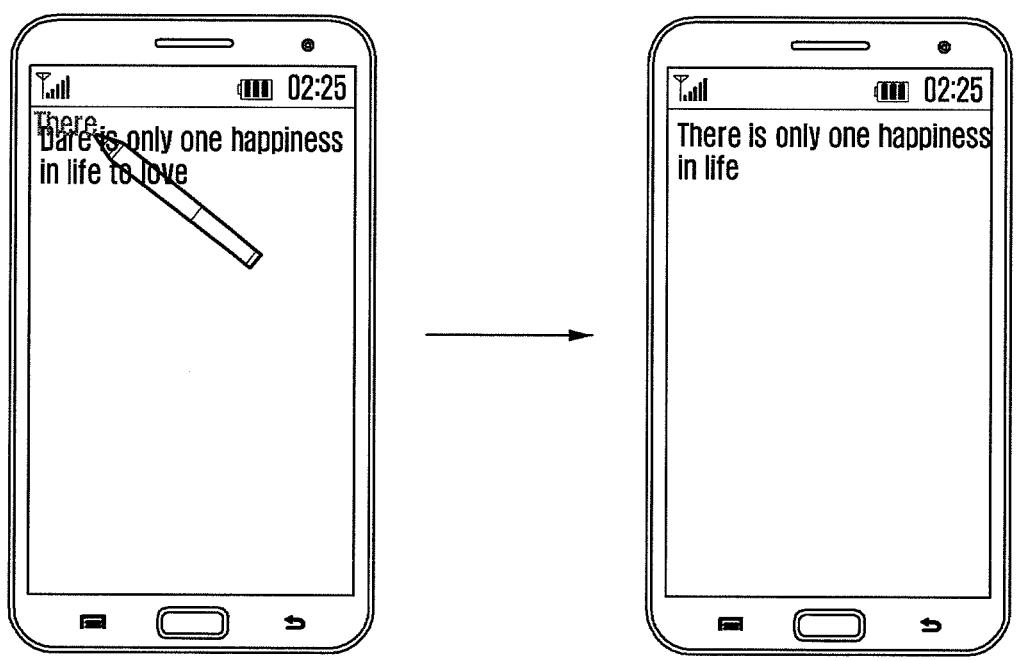
FIG. 9 illustrates a diagram of an exemplary situation of editing text in the terminal according to various embodiments of the present disclosure.
Figure 10:
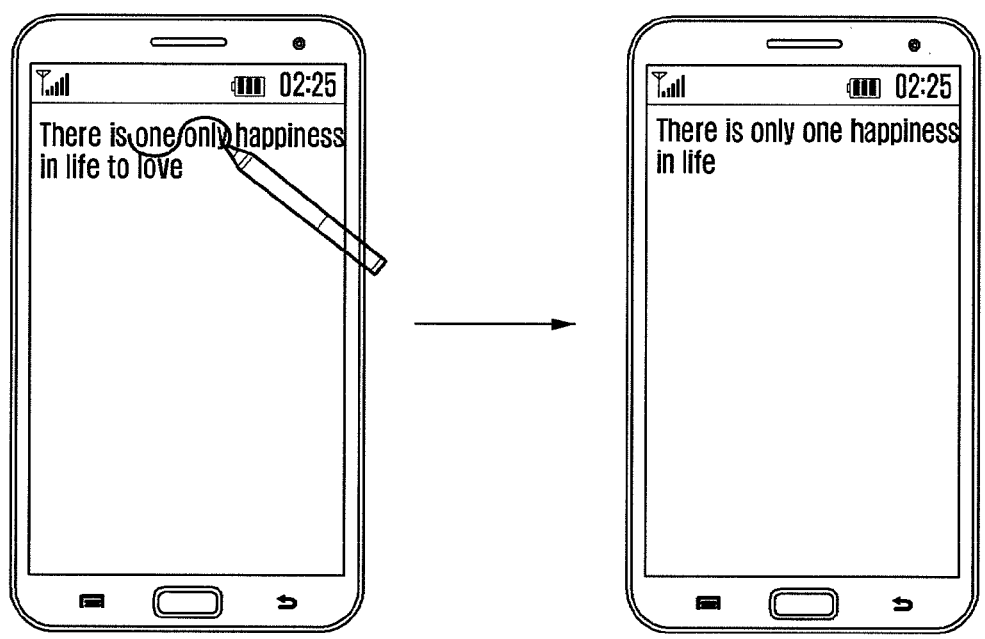
FIG. 10 illustrates a diagram of an exemplary situation of editing text in the terminal according to various embodiments of the present disclosure.

FIGS. 8 to 10 illustrate exemplary situations of editing text in the terminal according to various embodiments of the present disclosure.

The control unit 130 is capable of editing a text based on the touch or speech input analysis result. Editing the text may include at least one of inserting, deleting, cropping, copying, pasting, transpose, text conversion, saving, etc.

In the exemplary embodiment of FIG. 8, if a drag input is made across at least one letter, the control unit 130 is capable of editing the at least one letter.

In the exemplary embodiment of FIG. 9, if a touch input of writing at least one letter on at least one letter of previously written text, the control unit 130 corrects the at least one letter of the previously written text by replacing it with the at least one letter written newly.

The embodiments of FIGS. 8 and 9 can be implemented with various modifications.

For example, if the touch input is of dragging at least one letter or drawing a certain closed figure around the at least one letter or if the speech input is of speaking at least one letter, the control unit 130 is capable of deleting, cropping, copying, pasting, or saving the at least one letter in response to the touch or speech input.

Referring to FIG. 10, if the touch input is of drawing a proof-correction mark, the control unit 130 is capable of editing the text in correspondence to the proof-correction mark. The proof-correction mark may be any of ∨, ∧, ~, ∩, _, and -. The proof-correction marks correspond to inserting new matter, transpose, space removal (may be referred to as close space), underline insert, and deletion.

For example, if a touch input of drawing a shape of ~, the control unit 130 transposes letters or words.

Figure 11:
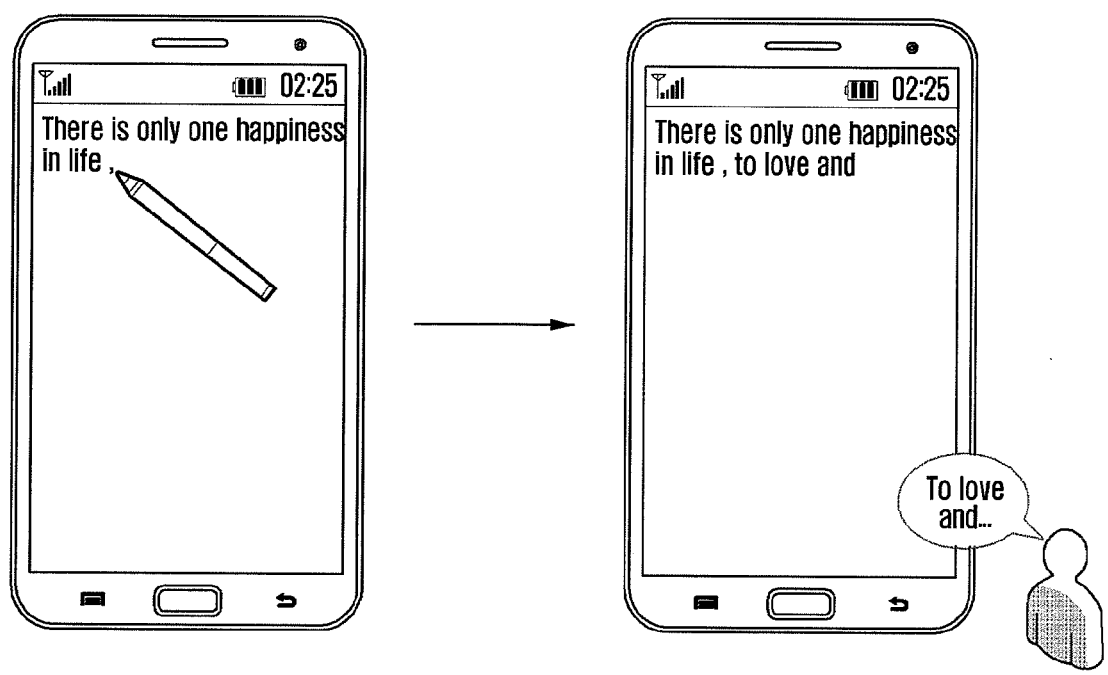
FIG. 11 illustrates a diagram of an exemplary situation of editing text in the terminal according to various embodiments of the present disclosure.
Figure 12:
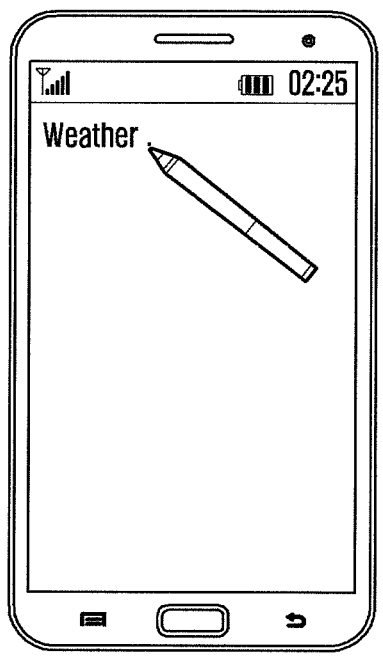
FIG. 12 illustrates a diagram of an exemplary situation of editing text in the terminal according to various embodiments of the present disclosure.
Figure 12:
Figure 12:
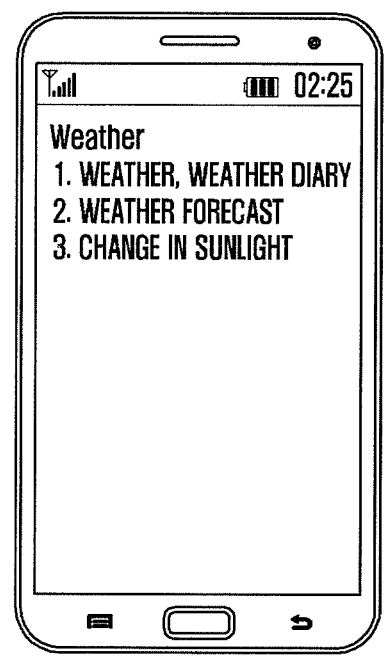
Figure 12:
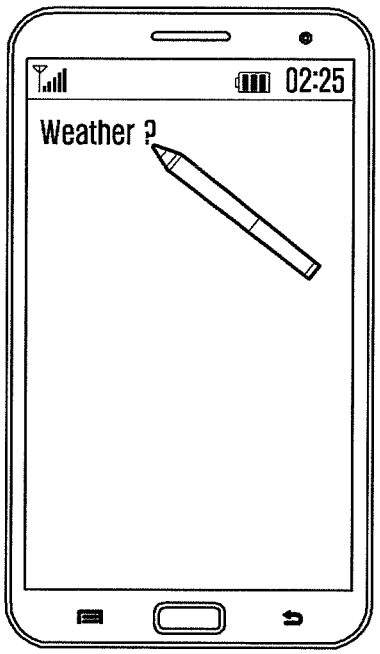
Figure 12:
Figure 12:
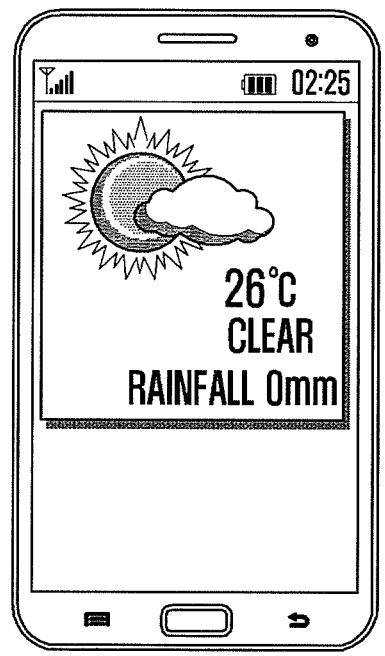

FIGS. 11 and 12 illustrate exemplary situations of editing text in the terminal according to various embodiments of the present disclosure.

Referring to FIG. 11, in order for the user to insert a special symbol (which is difficult in speech) between sentences, the control unit 130 may detect a touch input of special symbol between sentences and inserts the symbol there between. The control unit 130 is also capable of detecting next touch input of at least one letter after the insertion of the special symbol and generates at least one letter newly in subsequence to the previous text.

Referring to FIG. 12, if a touch input of writing a special symbol is detected, the control unit 130 is capable of determining the type of the sentence based on the special symbol. The sentence type can be classified into one of declarative sentence, interrogative sentence, and exclamatory sentence that are determined by period (.), question mark (?), and exclamation mark (!), respectively.

For example, if a touch input of drawing the period (.) is detected at the end of a letter, the control unit 130 determines that a declarative sentence is written. In this case, the control unit 130 is capable of searching for information on the at least one letter of the sentence and controlling the display unit 140 to display the acquired information. The information search may be performed through at least one of a normal web search, dictionary lookup, and search of internal storage of the terminal 100.

For another example, if a touch input of drawing the question mark (?) after a letter, the control unit 130 determines that an interrogative sentence is written. In this case, the control unit 130 may answer the question of the interrogative sentence and controls the display unit 140 to display the answer.

Figure 13:
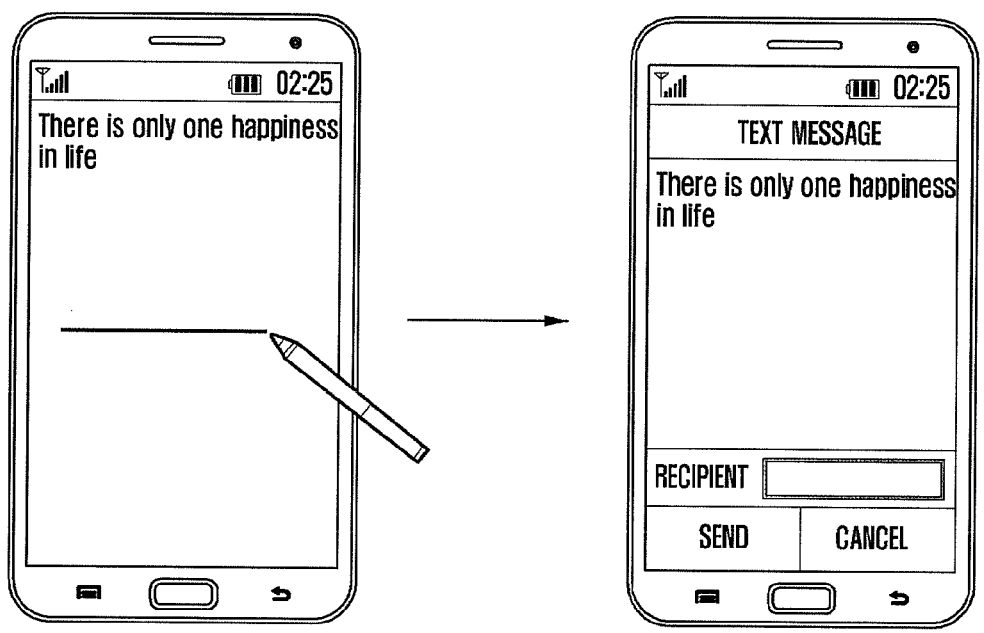
FIG. 13 illustrates a diagram of an exemplary situation of editing text in the terminal according to various embodiments of the present disclosure.
Figure 14:
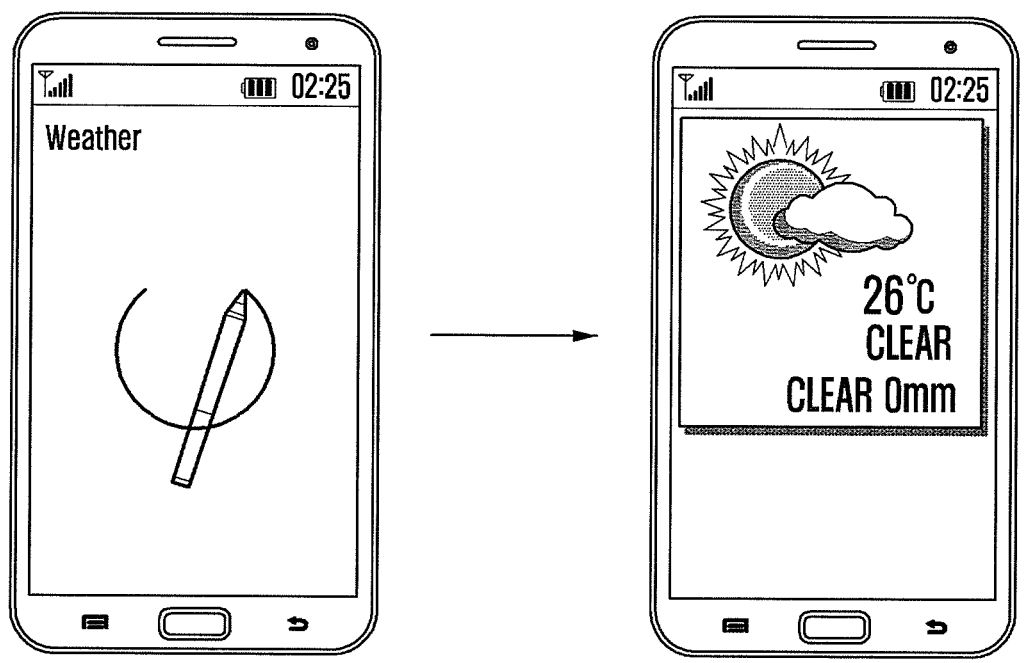
FIG. 14 illustrates a diagram of an exemplary situation of editing text in the terminal according to various embodiments of the present disclosure.

FIGS. 13 and 14 illustrate exemplary situations of editing text in the terminal according to various embodiments of the present disclosure.

The control unit 130 is capable of controlling the function of the terminal in response to the touch or speech input. The functions of the terminal may include at least one of NLP execution, placing a call, sending a text message, storing a memo, information search, and multimedia playback. A function of the terminal may be executed according to the touch input determined with touch location, drag length, and drawn figure, or a speech input recognition result.

In the exemplary embodiment of FIG. 13, the control unit 130 is capable of controlling the text messaging function of the terminal to transmit the at least one letter in the form of a text message in response to the touch input.

In the exemplary embodiment of FIG. 14, the control unit 130 is capable of performing information search corresponding to the at least one letter in response to the touch input.

The control unit 130 is capable of performing NLP on the speech input to execute a function corresponding to the NLP result or retrieving a multimedia file in response to the touch or speech input to play the multimedia file.

Figure 15:
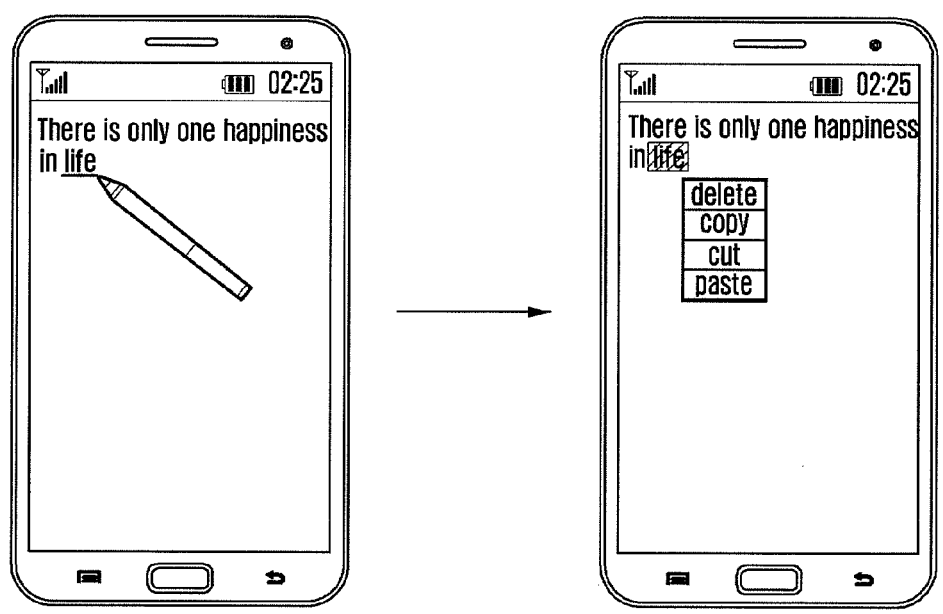
FIG. 15 illustrates a diagram of an exemplary situation of editing text in the terminal according to various embodiments of the present disclosure.
Figure 16:
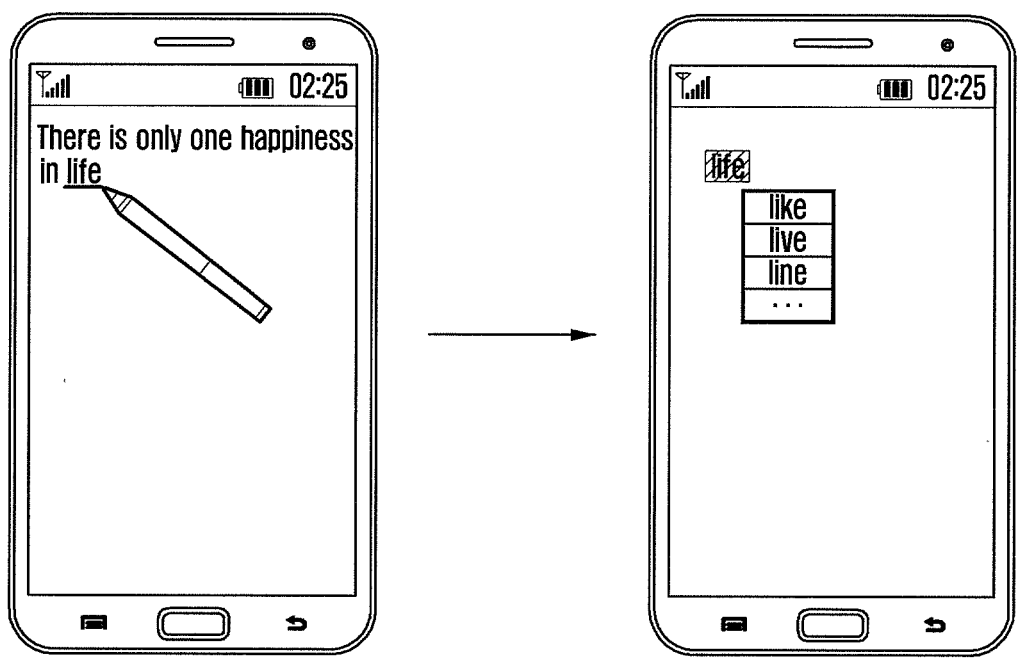
FIG. 16 illustrates a diagram of an exemplary situation of editing text in the terminal according to various embodiments of the present disclosure.

FIGS. 15 and 16 illustrate exemplary situations of editing text in the terminal according to various embodiments of the present disclosure.

The control unit 130 is capable of controlling the display unit 140 to display a submenu in response to a touch or speech input.

For example, if a touch input is made to at least one letter or a certain position, the control unit 130 is capable of controlling to display a submenu related to the at least one letter or the position. In the case, the submenu may include at least one deletion, copy, crop, paste, and save items.

If a touch input of selecting at least one letter or a certain position, the control unit 130 is capable of displaying a submenu related to the selected letter or position. In this case, the submenu may show a list of substitute letters.

The substitute letter list includes at least on substitute letter for use in correcting the at least one letter selected by the user and is updated based on the use frequency of the letters.

In detail, if the user corrects at least letter by replacing it with another at least one letter, the control unit 130 generates a substitute text data associated with the at least one corrected letter and stores the substitute data. When the user edits at least one letter, the control unit 130 updates the substitute letter data and sorts and manages the letters in the order of corrective use frequency of the letters.

The control unit 130 is capable of transmitting or receiving the substitute letter list to and from another terminal or an external server.

The terminal and speech-recognized text edit method thereof according to the present disclosure is capable of editing misrecognized speech-input text efficiently though finger or pen gesture-based or speech recognition-based input.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal for editing text, the method comprising:
   recognizing a user speech input by a speech recognition module;
   displaying, on a screen of a display, at least one text recognized from the user speech input by the speech recognition module;
   detecting a user touch input corresponding to the displayed at least one text, the user touch input made by an input tool including a stylus pen having an auxiliary key;
   detecting a type, a duration, and a position of the detected user touch input; and
   performing at least one function based on the type, the duration, and the position of the detected user touch input,
   wherein performing the at least one function comprises:
      performing, if the user touch input is detected and the auxiliary key is activated, a first function,
      performing, if the user touch input is detected and the auxiliary key is not activated, a second function, and
      displaying on the screen of the display, if the position of the user touch input is not corresponding to the position of the displayed at least one text, a submenu including deletion, copy, paste, cropping, and save items.

2. The method of claim 1,
   wherein the first function is correcting the displayed at least one text by replacing the displayed at least one text by newly inputted text, and
   wherein the second function is editing the displayed at least one text, the editing including at least one of inserting, deleting, cropping, copying, and pasting.

3. The method of claim 1, wherein the submenu is related to the position of the user touch input.

4. The method of claim 3, wherein the submenu further includes a text edit, a substitute letter list, and font change items.

5. A terminal comprising:
   a display configured to display at least one text input using speech recognition performed by a speech recognition module;
   a touch input unit configured to detect a touch input made by an input tool including a stylus pen having an auxiliary key;
   a speech input unit configured to detect a speech input; and
   a controller configured to:
      detect a user touch input corresponding to the displayed at least one text,
      detect a type, a duration, and a position of the detected user touch input,
      perform at least one function based on the type, the duration, and the position of the detected user touch input,
   wherein the controller is further configured to:
      perform, if the user touch input is detected and the auxiliary key is activated, a first function,
      perform, if the user touch input is detected and the auxiliary key is not activated, a second function, and
      display on the display, if the position of the user touch input is not corresponding to the position of the displayed at least one text, a submenu including deletion, copy, paste, cropping, and save items.

6. The terminal of claim 5,
   wherein the first function is correcting the displayed at least one text by replacing the displayed at least one text by newly inputted text, and
   wherein the second function is editing the displayed at least one text, the editing including at least one of inserting, deleting, cropping, copying, and pasting.

7. The terminal of claim 5, wherein the submenu is related to the position of the user touch input.

8. The terminal of claim 7, wherein the submenu further includes a text edit, a substitute letter list, and font change items.

* * * * *